Figure 1:
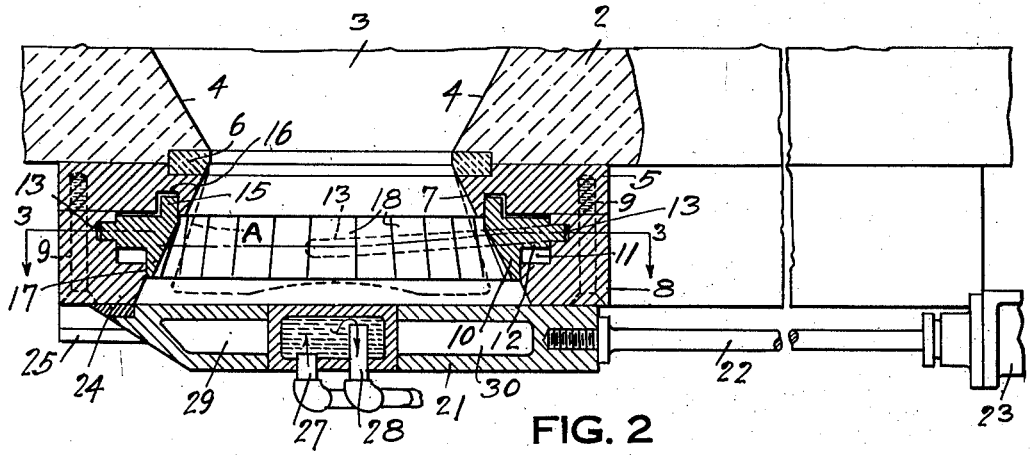

Feb. 9, 1926.

F. E. TROUTMAN ET AL 1,572,581

CASTING PLATE GLASS

Filed April 14, 1924

INVENTORS
Frank E. Troutman
Charles H. Christie
By Kay, Totten & Brown,
Attorneys.

Patented Feb. 9, 1926.

1,572,581

UNITED STATES PATENT OFFICE.

FRANK E. TROUTMAN AND CHARLES H. CHRISTIE, OF BUTLER, PENNSYLVANIA.

CASTING PLATE GLASS.

Application filed April 14, 1924. Serial No. 706,393.

*To all whom it may concern:*

Be it known that we, FRANK E. TROUTMAN and CHARLES H. CHRISTIE, citizens of the United States, and residents of Butler, in the county of Butler and State of Pennsylvania, have invented a new and useful Improvement in Casting Plate Glass; and we do hereby declare the following to be a full, clear, and exact description thereof.

Our invention relates to the manufacture of plate glass, and particularly to a system of casting plate glass wherein the molten glass is discharged in a vertical column through an outlet and is received on a casting table which is moved beneath the outlet to receive a charge of glass, the glass being then rolled flat upon the table in the usual manner.

The object of our invention is to provide an improved method and means for starting the flow of glass through the discharge outlet at the beginning of each casting operation.

When glass is caused to flow through an opening, it is a comparatively simple matter to interrupt the flow by moving a knife or other instrument across the outlet, thereby severing the glass and preventing further flow. When, however, it is desired to reestablish the flow of glass, a difficult problem is presented because the glass at the outlet tends to chill and solidify to a greater or less extent, and the solidified or partly solidified glass tends to clog the outlet either wholly or partially, thus preventing the flow of glass when the outlet is uncovered, or reducing the volume of the issuing glass and changing its shape. These difficulties are especially troublesome in the casting of plate glass, because it is necessary that all of the glass received on the casting table, including the first portion as well as the portions later received, shall be clean, free from cold streaks and in the proper shape and condition for rolling.

In our co-pending application for Letters Patent, Serial No. 525,327, filed December 28, 1921, we have illustrated various means for starting and stopping the flow of glass from a receptacle, and for receiving the glass properly upon a casting table. Our present invention aims to improve still further certain of the glass discharging mechanisms shown in the above-mentioned application.

In carrying out our invention we do not attempt to avoid the chilling of glass at the discharge outlet in the intervals between the discharges of glass but, on the contrary, we promote such chilling by means of a cooled knife which is moved beneath the outlet to sever the issuing glass, and is held in this position for a sufficient time to cause the glass above the shear and adjacent to the walls of the outlet to solidify at least partially. The discharge outlet is preferably made to flare downwardly and a portion of the wall of the outlet is made movable, such movable portion being arranged either for vertical movement or for partial or complete rotation, which may advantageously be combined with a downward movement of the movable wall section. When the next discharge of glass is to be started, the shear is removed, leaving the outlet plugged with a body of chilled glass. The movable part of the outlet wall is then moved to dislodge the plug of chilled glass, which falls from the outlet as a unit, and is followed by a stream of clean, hot glass. The solidified or partially solidified leading portion of the glass is discarded and the stream of glass is received upon a casting table in the manner described in our co-pending application mentioned above.

Figure 2:
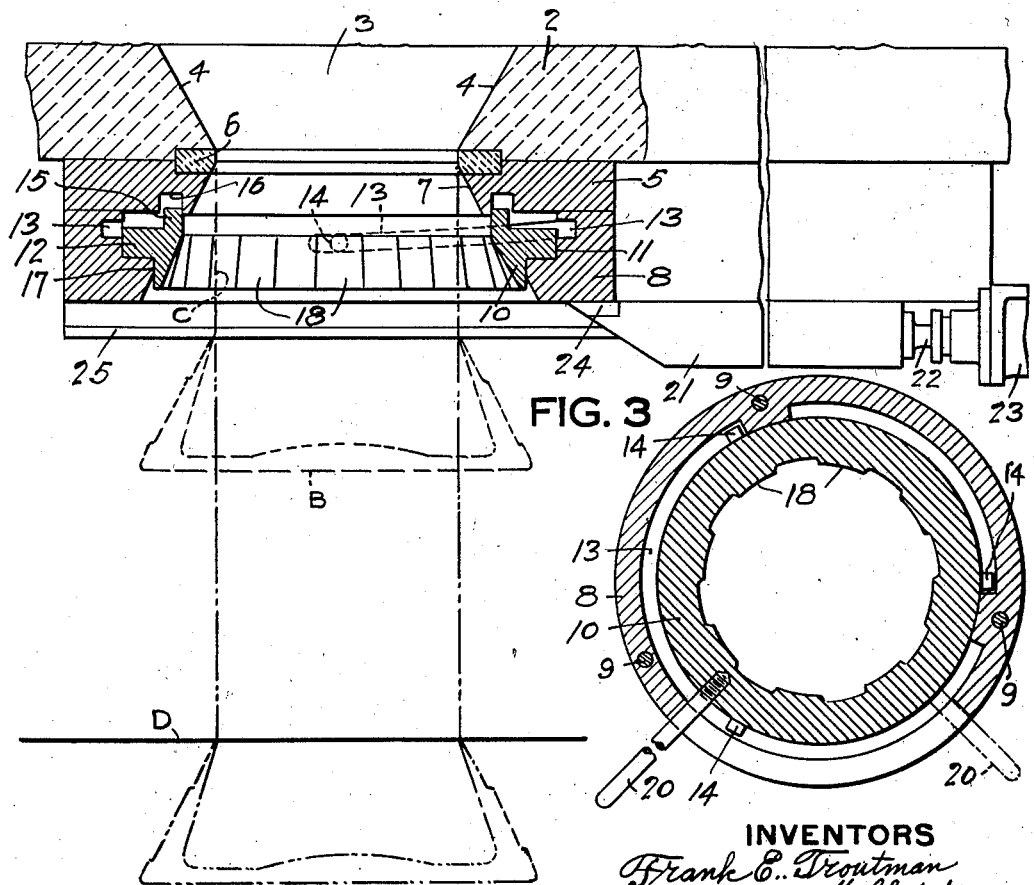

For a more detailed explanation of our invention, reference may now be had to the accompanying drawing, in which Fig. 1 is a vertical sectional view taken centrally through the outlet of a glass receptacle provided with flow-controlling apparatus constructed in accordance with our invention; Fig. 2 is a similar vertical sectional view showing the parts of the flow-controlling apparatus in a different position, and Fig. 3 is a horizontal sectional view taken substantially on the line 3—3, Fig. 1.

In the drawing, the numeral 2 indicates a portion of the refractory bottom wall of a glass container which may be a forehearth connected to a continuous tank furnace, or may be any other receptacle suitable for containing a considerable quantity of molten glass. In the bottom wall 2 is formed a discharge outlet 3, the walls 4 of which may taper downwardly, as shown. Surrounding the discharge outlet 3 and secured beneath the bottom wall 2 in any suitable manner, is an annular metal plate 5. A ring 6, composed of refractory or other material having resistance to erosion by molten glass, is held in a recess formed by grooves cut in the bottom wall 2 of the container, and in the upper and inner surface of the metal plate 5. It will be apparent that the ring 6 forms the effective outlet of the glass container during the normal flow of the glass.

The walls of the central opening in the plate 5 are made to flare downwardly and outwardly, as shown at 7. A stationary metal ring 8 is secured beneath the annular plate 5 by means of screw bolts 9, or otherwise, and serves to support a movable ring member 10. For this purpose the ring 8 is provided with an annular recess 11 to receive a horizontal flange 12 which is formed on the movable ring 10. The ring 8 also has one or more circularly curved grooves 13 which receive lugs 14 that project horizontally from the flange 12 of the movable ring 10. The grooves 13 are preferably inclined somewhat, as shown in Figs. 1 and 2, so that when the ring 10 is rotated, it is given a vertical movement in addition to its rotary movement, the grooves 13 and the lugs 14 co-operating in the manner of screw threads. For the purpose of guiding the movable ring 10, this ring is provided with a vertical annular flange 15 that is received in an annular groove 16 formed in the under side of the plate 5. The ring 10 is also guided by engagement of its vertical annular surface 17 with a corresponding vertical surface formed at the inner edge of the ring 8.

The exposed inner surfaces of the stationary ring 8 and the movable ring 10 conform generally to the flaring shape of the inner surface 7 of the opening in the plate 5. However, the movable ring 10 may be provided with a number of spaced projections 18 which serve to grip the glass which solidifies adjacent to the ring 10 and thus enables the ring 10 to carry the solidified glass with it when this ring is turned in its guideways. These projections, however, are not necessarily employed, and may be omitted if desired.

The movable ring 10 is provided with suitable means for giving this ring a partial or complete rotation. In the construction shown in Fig. 3, such means consists of a horizontal handle bar 20 which is screwed into a tapped opening formed in the side of the ring 10 and extends through a suitable slot or other opening in the stationary ring 8. As shown, the handle 20 is movable between the positions shown in full lines and dotted lines in Fig. 3 but this range of movement may be increased or decreased as desired. The handle may be replaced by motor-driven gearing which may be arranged to rotate the ring 10 either partially or completely.

Mounted slidably beneath the stationary ring 9 is a hollow shear 21 that is connected by means of a rod 22 to reciprocating means which are indicated somewhat diagrammatically as a cylinder 23. The shear 21 may be provided with a removable tip 24 and may be mounted to slide on suitable guides, one of which is shown at 25.

For the purpose of cooling the central portion of the shear 21, we provide in this portion of the shear a closed box 26 having inlet and outlet pipes 27 and 28, respectively, these pipes being connected by means of flexible tubes to any convenient source of water or other cooling fluid. The hollow portions 29 and 30 of the shear 21 may be artificially cooled if desired by means of air blasts or otherwise, but are preferably cooled to a less extent than the central portion of the shear, so that the chilled glass which forms above the shears will be thicker in the center of the outlet than at the sides.

In describing the operation of the apparatus described above, it may be assumed that a charge of glass has been delivered through the outlet 3, and that the shears 21 has been moved beneath the outlet to interrupt the flow of glass. The portion of the glass adjacent to the upper surface of the shear 21 immediately begins to solidify, and this solidification is most pronounced immediately above the water-cooled box 26. At the same time, the glass also solidifies adjacent to the walls of the stationary ring 8, the movable ring 10, and the annular plate 5, but to a less extent than the glass in contact with the shear 21. After a time the glass becomes solidified in somewhat the manner indicated by the dotted line A in Fig. 1. It will be observed that the solidification diminishes upwardly, and we find that the glass just above the movable ring 10 is of a semi-fluid or pasty consistency. The increased thickness of the solid glass immediately above the water-cooled box increases the strength of the plug of solid glass at this point, and resists the tendency of the molten glass to break through the center of the plug when the shear is withdrawn.

When it is desired to deliver the next charge of glass, the shear 21 is removed from beneath the outlet, and the outlet remains plugged by the solidified glass. If the movable ring 10 is arranged to rotate, as shown in the drawing, it is then turned by means of the handle 20 or otherwise, thus twisting the plug of glass in the outlet. We find that a simple vertical or horizantal movement of the ring 10 is sufficient to dislodge the plug of solidified glass, but this effect is increased by causing the ring 10 to move both downwardly and circularly. The engagement between the ring 10 and the glass is promoted by the projections 18. Through this twisting operation the solidified glass is released from contact with the stationary surfaces of the glass outlet, and the static head of glass above the outlet forces the solidified glass to fall in the manner shown in dotted lines at B on Fig. 2. This plug of wholly or partially solidified glass is followed by a stream C of clean, hot glass. The plug and leading end of the stream are preferably allowed to fall beside the front edge of a casting table, the surface of which is indicated at D, Fig. 2, and the table is then moved beneath the glass outlet to receive a charge of the glass which continues to flow from the outlet until it is interrupted by again moving the shear 21 to the position shown in Fig. 1.

It is a most important feature of our invention that the movable member 10 dislodges the solidified glass by its downward movement, and such downward movement may or may not be combined with rotary movement.

We have shown and described an embodiment of our invention which we have found to be satisfactory in actual practice, but it will be understood that various changes in the construction and arrangement of parts may be made without departing from our invention, the scope of which is indicated in the appended claims.

We claim as our invention:

1. The method of controlling the discharge of glass from an outlet, that comprises applying a chilling instrument to said outlet, thereby causing the glass within said outlet to harden, withdrawing said instrument from said outlet, and loosening the hardened glass in said outlet by downwardly moving a member adjacent to said glass within said outlet.

2. The method of controlling the discharge of glass from an outlet, that comprises applying a chilling instrument to said outlet, thereby causing the glass within said outlet to harden, withdrawing said instrument from said outlet, and loosening the hardened glass in said outlet by downwardly moving an annular member surrounding said outlet.

3. The method of controlling the discharge of glass from an outlet, that comprises applying a chilling instrument to said outlet, thereby causing the glass within said outlet to harden, withdrawing said instrument from said outlet, and loosening the hardened glass in said outlet by applying a downward force thereto, thereby permitting said hardened glass to issue from said outlet, followed by a body of unhardened glass.

4. The method of controlling the discharge of glass from an outlet, that comprises applying a chilling instrument to said outlet, thereby causing the glass within said outlet to harden, withdrawing said instrument from said outlet, and loosening the hardened glass in said outlet by applying a twisting force thereto, thereby permitting said hardened glass to issue from said outlet, followed by a body of unhardened glass.

5. The method of controlling the discharge of glass from an outlet, that comprises applying a chilling instrument to said outlet, thereby causing the glass within said outlet to harden, withdrawing said instrument from said outlet, and loosening the hardened glass in said outlet by applying a combined twisting and downwardly exerted force thereto, thereby permitting said hardened glass to issue from said outlet, followed by a body of unhardened glass.

6. The method of casting plate glass, that comprises causing glass to flow in a descending column through a downwardly opening outlet, interrupting said flow, and closing said outlet by moving a chilled severing member beneath said outlet, allowing said member to remain beneath said outlet until a body of hardened glass is formed in said outlet sufficient to prevent the glass from flowing, withdrawing said member from beneath said outlet, leaving said outlet plugged with said hardened glass, applying downward expelling force to the glass in said outlet, thereby dislodging the glass from the walls of said outlet, permitting the dislodged glass to fall from said outlet followed by a column of unhardened glass, receiving said column upon a casting table, and repeating said operations.

7. The method of casting plate glass, that comprises causing glass to flow in a descending column through a downwardly opening outlet, interrupting said flow, and closing said outlet by moving a chilled severing member beneath said outlet, allowing said member to remain beneath said outlet until a body of hardened glass is formed in said outlet sufficient to prevent the glass from flowing, withdrawing said member from beneath said outlet, leaving said outlet plugged with said hardened glass, twisting said hardened glass within said outlet, thereby dislodging the glass from the walls of said outlet, permitting the dislodged glass to fall from said outlet followed by a column of unhardened glass, receiving said column upon a casting table, and repeating said operations.

8. The method of casting plate glass, that comprises causing glass to flow in a descending column through a downwardly opening outlet, interrupting said flow, and closing said outlet by moving a chilled severing member beneath said outlet, allowing said member to remain beneath said outlet until a body of hardened glass is formed in said outlet sufficient to prevent the glass from flowing, withdrawing said member from beneath said outlet, leaving said outlet plugged with said hardened glass, twisting said glass in said outlet and simultaneously forcing said glass downwardly, thereby dislodging the glass from the walls of said outlet, permitting the dislodged glass to fall from said outlet followed by a column of unhardened glass, receiving said column upon a casting table, and repeating said operations.

9. Apparatus for casting plate glass comprising a glass receptacle having a downwardly opening outlet, an annular structure beneath said outlet having a downwardly movable inner portion, and a shear member adapted to be moved into and out of position beneath the opening defined by said annular structure.

10. Apparatus for casting plate glass comprising a glass receptacle having a downwardly opening outlet, an annular structure beneath said outlet having a rotatably movable inner portion, and a shear member adapted to be moved into and out of position beneath the opening defined by said annular structure.

11. Apparatus for casting plate glass comprising a glass receptacle having a downwardly opening discharge outlet, an annular structure beneath said outlet, a movable ring supported in said annular structure, means for imparting vertical movement to said ring, a shear movable horizontally beneath said annular member, and means for artificially cooling said shear.

12. Apparatus for casting plate glass comprising a glass receptacle having a downwardly opening discharge outlet, an annular structure beneath said outlet, a movable ring supported in said annular structure, means for imparting rotary movement to said ring, a shear movable horizontally beneath said annular member, and means for artificially cooling said shear.

13. Apparatus for casting plate glass comprising a glass receptacle having a downwardly opening discharge outlet, an annular structure beneath said outlet and having a downwardly flaring cavity, a horizontally movable ring supported in said annular structure, and having its inner surface communicating with said flaring opening, and a shear movable horizontally beneath said structure.

14. Apparatus for casting plate glass comprising a glass receptacle having a downwardly opening discharge outlet, an annular structure beneath said outlet and having a downwardly flaring cavity, a horizontally movable ring supported in said annular structure and having its inner surface communicating with said flaring opening, and a shear movable horizontally beneath said structure, said ring having projections adapted to interlock with glass solidified adjacent to said ring.

15. Apparatus for casting plate glass comprising a glass receptacle having a downwardly opening discharge outlet, a shear movable horizontally beneath said outlet and means for maintaining the central portion of said shear cooler than the side portions thereof, said central portion serving to arrest the central part of a stream of glass, and the side portions of the shear serving to arrest that part of the stream surrounding said central part.

16. Apparatus for casting plate glass comprising a glass receptacle having a downwardly opening discharge outlet, a shear movable horizontally beneath said outlet to control the discharge of glass therefrom, means for artificially cooling said shear comprising an enclosure carried by said shear at the portion of said shear which lies beneath the center of said outlet when the shear is in position to close said outlet, and means for circulating cooling fluid through said enclosure, the said cooled portion of the shear serving to arrest the central part of a flow of glass, and the portion of the shear at the sides of said cooled portion serving to arrest that portion of the glass surrounding said central part.

17. Apparatus for casting plate glass comprising a glass receptacle having a downwardly opening discharge outlet, a shear movable horizontally beneath said outlet to control the discharge of glass therefrom, said shear having a closed central portion and opened hollow portions adjacent to said central portion, and pipes for circulating cooling fluid through the closed central portion of said shear.

18. Apparatus for casting plate glass comprising a glass receptacle having a downwardly opening discharge outlet, a shear movable horizontally beneath said outlet to control the discharge of glass therefrom, said shear having a closed central portion and opened hollow portions adjacent to said central portion, pipes for circulating cooling fluid through the closed central portion of said shear, and a removable shearing tip secured to the end of said shear.

19. Apparatus for casting plate glass comprising a glass receptacle having a downwardly tapering discharge outlet, an annular plate secured beneath said receptacle and surrounding said outlet and said ring, a stationary ring secured beneath said annular plate, a movable ring mounted for vertical movement in guides formed in said stationary ring, means for moving said movable ring, and a shear movable horizontally beneath said stationary ring.

20. Apparatus for casting plate glass comprising a glass receptacle having a downwardly tapering discharge outlet, an annular plate secured beneath said receptacle and surrounding said outlet and said ring, a stationary ring secured beneath said annular plate, a movable ring mounted for vertical movement in guides formed in said stationary ring, means for moving said movable ring, and a shear movable horizontally beneath said stationary ring, said annular plate, stationary ring and movable ring cooperating to form a downwardly flaring opening beneath the opening in said glass receptacle.

21. Apparatus for casting plate glass comprising a glass receptacle having a downwardly tapering discharge outlet, a refractory ring disposed at the bottom of said outlet, an annular plate secured beneath said receptacle and surrounding said outlet and said ring, a stationary ring secured beneath said annular plate, a movable ring mounted for vertical movement in guides formed in said stationary ring, means for moving said movable ring, and a shear movable horizontally beneath said stationary ring, said annular plate, stationary ring and movable ring cooperating to form a downwardly flaring opening beneath the opening in said glass receptacle, said movable ring being provided with projections to interlock with glass solidified adjacent to the inner surface of said ring.

22. Apparatus for casting plate glass comprising a glass receptacle having a downwardly opening discharge outlet, an annular structure surrounding said outlet, said annular structure including a movable ring having its inner surface exposed to the interior of said structure, and means for imparting to said ring a horizontal rotary movement.

23. Apparatus for casting plate glass comprising a glass receptacle having a downwardly opening discharge outlet, an annular structure surrounding said outlet, said annular structure including a movable ring having its inner surface exposed to the interior of said structure, and means for imparting to said ring a horizontal rotary movement combined with a downward movement.

24. Apparatus for casting plate glass comprising a glass receptacle having a downwardly opening discharge outlet, an annular structure beneath said outlet and defining a downwardly flaring opening, a ring mounted movably within said structure and communicating with said opening in said structure, and means for imparting to said movable ring a horizontal rotary movement.

25. Apparatus for casting plate glass comprising a glass receptacle having a downwardly opening discharge outlet, an annular structure beneath said outlet and defining a downwardly flaring opening, a ring mounted movably within said structure and communicating with said opening in said structure, and means for imparting to said movable ring a horizontal rotary movement combined with a downward movement.

26. Apparatus for casting plate glass comprising a glass receptacle having a downwardly opening discharge outlet, a stationary annular structure beneath said outlet and having circular grooves, a movable ring mounted in said grooves, guides formed in said stationary structure adjacent to said grooves, projections carried by said ring and received in said guides, a handle extending horizontally from said ring for moving said ring in said grooves and guides, and means for preventing said ring from lateral bodily movement during rotation thereof.

In testimony whereof we, the said FRANK E. TROUTMAN and CHARLES H. CHRISTIE, have hereunto set our hands.

FRANK E. TROUTMAN.
CHARLES H. CHRISTIE.